(12) United States Patent
Sarver

(10) Patent No.: US 6,588,169 B2
(45) Date of Patent: Jul. 8, 2003

(54) UNIVERSAL MOUNTING PLATE

(76) Inventor: Phillip T. Sarver, 4466 Horizon Dr., Carlsbad, CA (US) 92008

(*) Notice: Subject to any disclaimer, the term of this patent is extended or adjusted under 35 U.S.C. 154(b) by 49 days.

(21) Appl. No.: 09/881,867

(22) Filed: Jun. 15, 2001

(65) Prior Publication Data

US 2002/0035814 A1 Mar. 28, 2002

Related U.S. Application Data

(63) Continuation-in-part of application No. 09/728,875, filed on Dec. 4, 2000.
(60) Provisional application No. 60/234,908, filed on Sep. 25, 2000.

(51) Int. Cl.$^7$ .............................. E04B 1/38; E04C 5/00
(52) U.S. Cl. .............................. 52/713; 52/295; 52/701; 52/715; 24/16 R; 24/17 AP; 24/453; 248/74.3; 248/74.4; 403/DIG. 9
(58) Field of Search .......................... 52/712, 713, 715, 52/295, 693, 699, 701; 411/340, 344, 345; 24/453, 16 R, 17 AP; 248/74.3, 68.1, 74.4; 403/408.1, DIG. 9

(56) References Cited

U.S. PATENT DOCUMENTS

| | | | |
|---|---|---|---|
| 1,323,067 A | | 11/1919 | Keith |
| 2,366,401 A | | 1/1945 | Haskell |
| 3,182,939 A | | 5/1965 | Seckerson |
| 3,274,680 A | | 9/1966 | Cruse |
| 3,378,975 A | | 4/1968 | Hill |
| 3,458,184 A | | 7/1969 | Schlosser |
| 3,503,584 A | | 3/1970 | Erhart et al. |
| 4,286,497 A | * | 9/1981 | Shamah ................. 411/342 |
| 4,541,211 A | | 9/1985 | Garrett |
| 4,617,702 A | * | 10/1986 | Diederich, Jr. ............ 24/16 |
| 4,736,554 A | | 4/1988 | Tyler |
| 4,834,603 A | | 5/1989 | Holton |
| 4,865,501 A | * | 9/1989 | Ferris .................. 411/340 |
| 4,872,298 A | | 10/1989 | Klemic, Jr. |
| 5,146,720 A | | 9/1992 | Turner |
| 5,392,581 A | * | 2/1995 | Hatzinikolas et al. ....... 52/712 |
| 5,628,161 A | | 5/1997 | Giannuzzi et al. |
| 5,794,394 A | | 8/1998 | Bill et al. |
| 6,131,360 A | * | 10/2000 | Dalen ................... 52/712 |
| 6,161,999 A | * | 12/2000 | Kaye et al. ............. 411/344 |
| 6,347,435 B1 | * | 2/2002 | Davignon et al. ....... 24/16 PB |

* cited by examiner

Primary Examiner—Carl D. Friedman
Assistant Examiner—Yvonne M. Horton
(74) Attorney, Agent, or Firm—The Maxham Firm (57) ABSTRACT

A device and method for mounting structures to masonry. The device has a cover plate with a plurality of extendable and retractable straps and is used to cover a hole in a masonry wall, while providing temporary support to various structural items to be attached to the masonry wall. Each strap also engages the inner surface of the masonry wall. The straps preferably have a series of ridges that engage the cover plate such that sufficient resistance is provided to temporarily affix various objects to be embedded in the masonry wall. The straps position the plate on the front surface of the masonry wall such that it is generally concentric with the masonry hole. Grout is then poured into the hollow cavity behind the masonry wall, thus securing the embedded material permanently. The cover plate is preferably transparent to allow the user to determine that the wall and hole are property grouted.

28 Claims, 7 Drawing Sheets

UNIVERSAL MOUNTING PLATE

CROSS-REFERENCE TO RELATED APPLICATIONS

This application is a continuation-in-part of application Ser. No. 09/728,875, filed Dec. 4, 2000, which claims the benefit of provisional application Ser. No. 60/234,908, filed Sep. 25, 2000.

BACKGROUND OF THE INVENTION

1. Field of the Invention

The present invention is directed generally to securing and anchoring devices and more particularly to a universal mounting plate particularly adapted for use in securing bolts, studs and other objects in masonry units.

2. Description of the Related Art

In construction of a building, there are many instances where masonry and other types of material, such as wood or steel, meet or intersect. Since masonry cannot easily be nailed or bolted to without expectation of breakage, various techniques and devices have been developed to allow masonry to be secured to such other materials. However, until the present invention, methods and devices for connecting to masonry elements generally have exhibited particular problems or disadvantages.

For example, one current method involves drilling a hole into the masonry item, placing a strap of metal in the hole and packing paper around the hole. When grout or cement is poured into the masonry, usually through the hollow middle in the case of concrete block, the paper, at least in part, limits grout leaking out of the hole. However, a significant amount of grout tends to leak during this procedure. If one tries to place more paper in the hole, this results in less room for grout to surround and support the strap, which results in a weaker connection.

Another method involves placing a threaded bolt into a hole drilled in the masonry, while attached to a suitably large piece of scrap wood, such as plywood. The machine bolt, all thread nuts and washer have to be installed on the bolt in the plywood at the time the plywood is temporarily secured to the masonry, such as by nails. After the grout or concrete dries, it is necessary to remove the nuts to remove the plywood and reinstall the nuts. In a typical construction, many bolts are installed. Accordingly, the steps involved in preparation and removal of the plywood requires significant time, resulting in additional labor costs.

Previous attempts to simplify and improve these processes include the use of a piece of flat sheet metal with several wire hooks for engaging the inside surface of a masonry wall, for example, as described in U.S. Pat. No. 5,794,394. The plate includes a hole for supporting an anchor bolt. While there are several clear advantages to this design over previous procedures, it still suffers some disadvantages. This design does not provide a way to visually inspect the connection among the masonry wall, the bolt and the grout. Additionally, this device is specifically tailored to attaching an anchor bolt to a masonry wall. This device would require significant alteration to accommodate other embedded items common to the industry such as a weld plate or a purlin anchor (PA) strap.

Also in using these devices, one could never be sure that the hole was adequately grouted and that air pockets, which inevitably initially exist, are sufficiently removed. This is because the plywood, metal plate or paper covering the hole and cannot be seen through. Accordingly, it would be beneficial to have a device that is used to secure bolts and other structures to masonry while allowing visual inspection of the grout filling process to ensure that the hole is completely grouted, that the bolt is centered in the hole, and that air pockets are removed.

Accordingly, there exists a need for a device which will easily center various items to be embedded within a hollow masonry wall structure, while providing assurance that the hole has been sufficiently grouted as desired. In addition, there is a need for a device that is adaptable to allow a variety of different materials to be securely connected to masonry items. The present invention satisfies these needs and provides related advantages as well.

SUMMARY OF THE INVENTION

The present invention provides a device and a method for securing a structure to masonry, and more particularly to a hollow concrete masonry unit such as a concrete building block. The wall of the masonry unit has an outer surface and an inner surface spaced apart from the outer surface, and also has a masonry hole therein. The device is made up of a plate of sufficient size to cover the masonry hole. The plate has a securing member hole therein and at least one strap mounting hole. The device also has at least one securing strap. Each strap has a first portion, and an anchor portion disposed at an angle to the first portion. The first portion of each strap is slidably engaged in the strap mounting hole and extends through the masonry hole so that the anchor portion of the securing strap contacts the inner surface so that when the securing strap is pulled through the strap mounting hole, the plate is positioned on the outer surface such that the securing member hole is concentric with the masonry hole.

In further embodiments of the device, each securing strap has a plurality of ridges along the first portion and each of the strap mounting holes has at least one tooth to engage the ribs of the securing strap.

In another embodiment, the plate of the device is transparent, the material is polyethylene, rubber or nylon and the cover plate is fluorescent or biodegradable.

In yet another embodiment, the securing member hole is configured to accept a machine bolt, a PA strap and a weld plate.

BRIEF DESCRIPTION OF THE DRAWING

The objects, advantages and features of the present invention will be more clearly understood by reference to the following detailed description, when read in conjunction with the accompanying drawing, in which.

DETAILED DESCRIPTION OF THE PREFERRED EMBODIMENT

The present invention relates to a universal mounting plate adapted for use in securing a variety of construction materials or structures to masonry items. An example of such a structure could be a wooden or steel beam. It is generally understood that masonry is a relatively brittle substance, requiring special tools and techniques for working with. In addition, when material such as wood or steel needs to be attached to a masonry wall, special challenges are faced. Using the present invention one can relatively easily attach wood or steel members to a masonry item allowing flexibility in building design and construction.

In a preferred embodiment, a connecting member, such as a threaded rod, a PA strap or a metal plate is secured to the masonry wall. The rod, strap or metal plate allows other structural members to be easily attached by the use of nuts, nails or welding, for example. When a rod or anchor bolt is used, it is placed in the device, inserted into about a precut hole in the masonry and then filled with grout. The objects and advantages of the invention include providing simple installation of various embedded items. The invention is particularly adapted for easy inspection and can be used with a wide variety of commonly embedded objects. Typically the device remains in the wall as a nonstructural member. The cover plate portion of the invention can also be removed after the grout has cured by simply separating the plate at a weakened joint provided therein, if additional inspection is required.

The present invention is a significant improvement over the prior art. The device herein provides a means for easily attaching several commonly embedded devices such as an anchor bolt, a PA Strap and a weld plate. Additionally, the device is preferably made of a transparent material so that a user has immediate feedback concerning the flow and coverage of grout. If voids are observed, a user may take immediate corrective action, unlike previous uses of plywood or sheet metal which would not be discovered until after the grout has cured.

In addition, the use of securing straps and a cover plate ensures that the connecting member is placed in the center of the hole drilled in the masonry, which affords maximum grout contact. It also ensures that the connecting member does not move about during grout filling and that grout does not leak from the hole that has been drilled. Since the device is preferably made of a plastic material, portions of the device protruding from the front surface of the masonry wall can be easily trimmed off after the grout has cured. This provides an unobstructed installation and a clean finished look.

Figure 1:
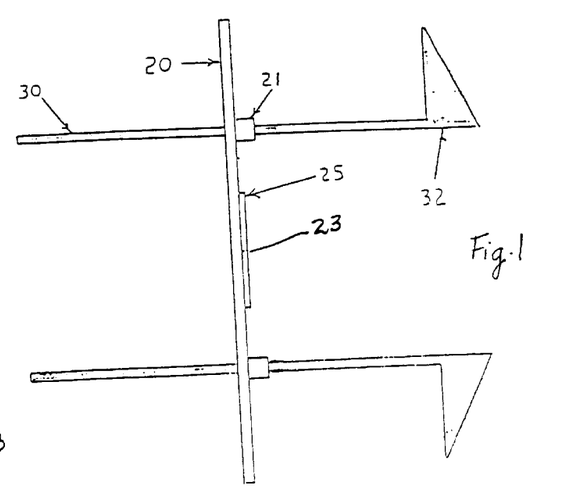
FIG. 1 is a side view of a universal mounting plate representing one embodiment of the invention.
Figure 3:
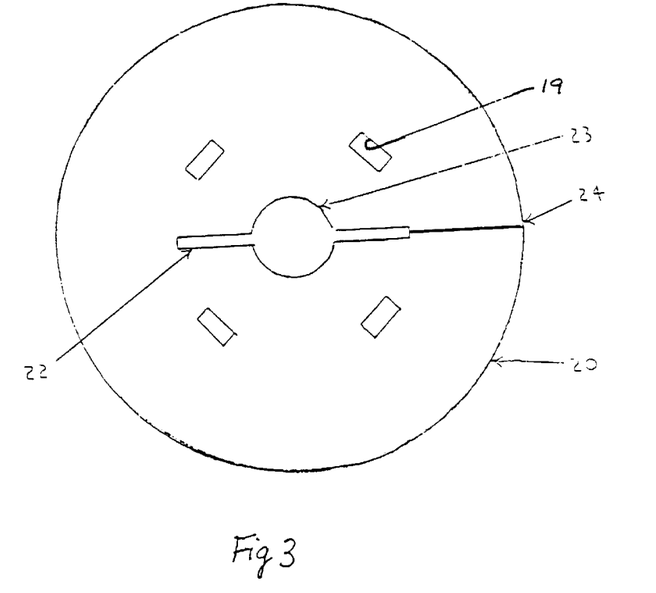
FIG. 3 is an outside plan view of one embodiment of a plate used in connection with the present invention.

Referring now to the drawing, and more particularly to FIG. 1, a side view of one embodiment of the invention is shown. Cover plate 20 is shown with reinforcing land 25 and securing member hole 23. The cover plate is generally disc-shaped. Securing strap 30 is passed through a strap mounting hole 19 in boss 21. Hole 19 is shown in FIG. 3. Anchor portion 32 on the inside end of the strap is shown as having a generally triangular shape. However it is contemplated that anchor portion 32 can be any other suitable shape that allows the anchor portion to contact an inner surface of the masonry item such that it prevents the device from falling out.

Figure 2:
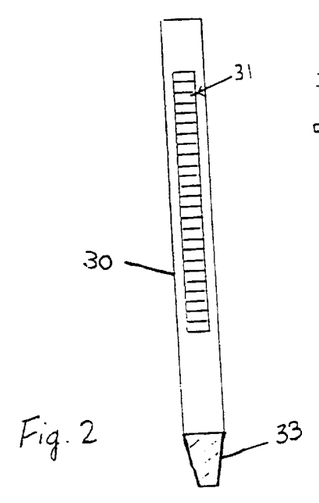
FIG. 2 is a partial plan view of a securing strap.

In FIG. 2 more details of the securing strap are shown. For example, along the length of securing strap 30 are a plurality of ridges 31, which serve to frictionally engage with teeth or detents in he mounting hole in boss 21. Outside end 33 of the strap 30 is tapered to facilitate installation of the strap into the mounting hole.

Cover plate 20, shown in FIG. 3, is preferably made of generally transparent plastic. It consists of several apertures including, concentric or centered securing member hole 23, generally centered slot 22, and four strap mounting holes 19 which are preferably evenly spaced apart from the plate's center. Also formed into the plate is weakened joint 24, which extends from the end of one side of slot 22 to the outer dimension of plate 20. When the weakened joint is opened it provides for ease of installation of cover plate 20 onto the stem of a weld plate, for example. In addition, opened joint 24 enables removal of cover plate 20, if desired, after the grout has cured. In preferred embodiments of cover plate 20, apertures are reinforced, as shown by elevated or raised portions of cover plate material surrounding the various apertures. Examples of this reinforcement is raised land 25 about securing member hole 23, and bosses 21 through which straps 30 pass.

As contemplated herein, the term "securing member hole" refers to a hole or aperture in cover plate 20 into which a variety of objects can be inserted. These include, for example, anchor bolts which are commonly used in the construction trade, straps or other connecting members which are known to those skilled in the art.

Figure 4:
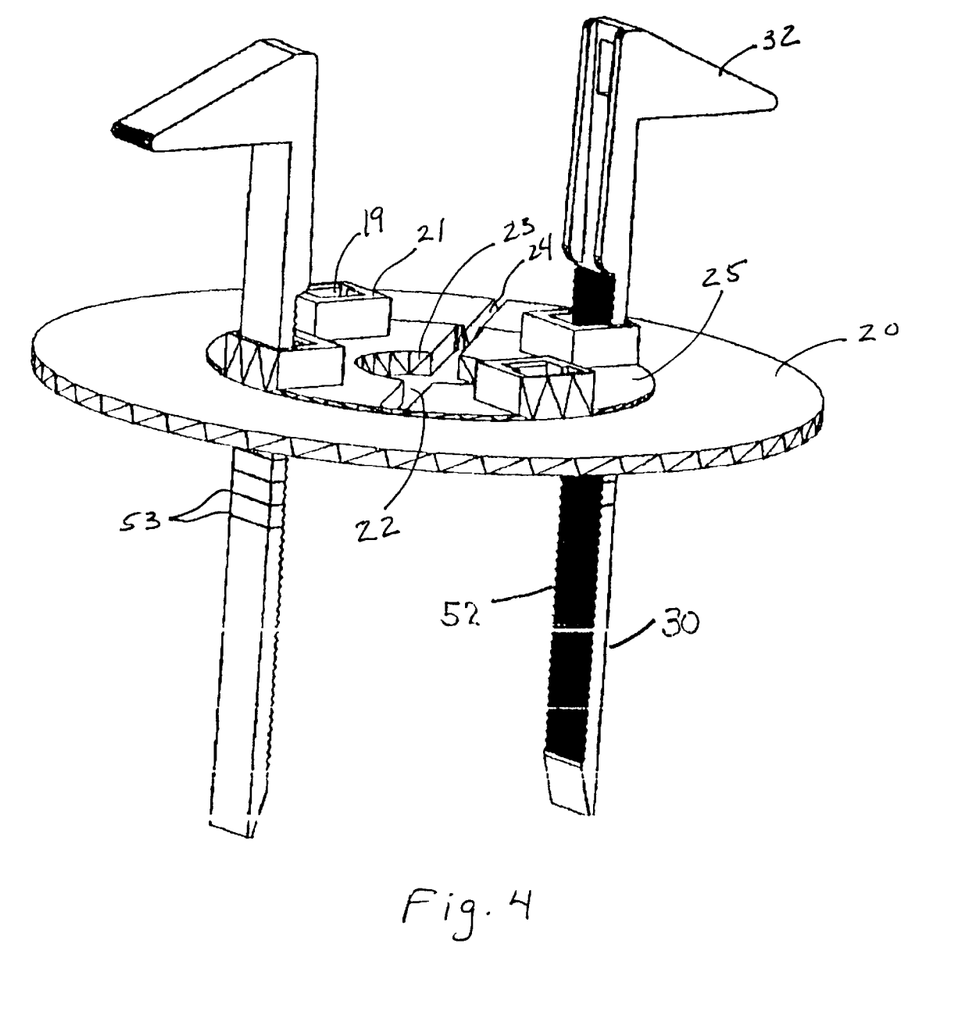
FIG. 4 is an inside perspective view of an alternate embodiment of the present invention.

FIG. 4 shows essentially the embodiment of FIGS. 1–3 in perspective, where ridges 52 are positioned on a side of the first portion of securing strap 30 that faces toward the center of the device. If desired, ridges 52 can be positioned on the side of the strap 30 that faces toward the outside perimeter of the device. Score lines 53 in straps 30 can be provided to enable the externally protruding ends of the straps to be cut off or snapped off after the mounting plate is installed. Note that bosses 21 are approximately tangential to the periphery of circular land 25. These bosses project into the hole in the masonry wall and serve the additional function of centering cover plate 20 over the masonry hole.

Figure 5:
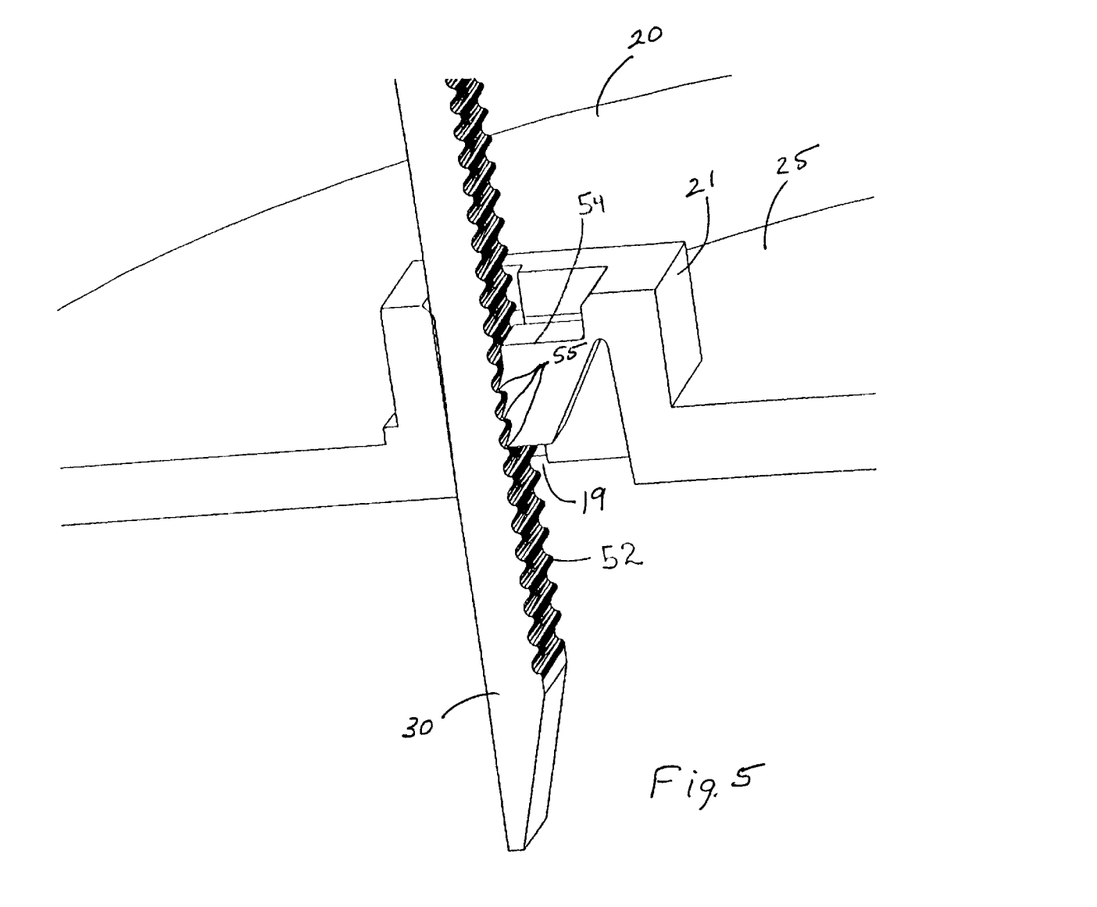
FIG. 5 is an expanded view of the engaging mechanism.

FIG. 5 provides more detail of an embodiment of the slidable engagement of ridges 52 in mounting hole 19 in boss 21, in which is ridge engagement tab 54. It can be seen that teeth having a shape corresponding to the shape of individual ridges 52 are provided on the contact surface of tab 54. Engaging teeth 55 of tab 54 may have a sloped saw-tooth shape as shown, or they may be simple projections. Likewise, ridges 52 may be simple projections or they may have a sloped saw-tooth shape for enhanced positive engagement. Oppositely sloped saw-tooth shapes on the engaging elements would provide a very secure position, not easily reversed, for the strap in the mounting hole. The securing strap can be referred to as a zip tie.

Figure 6A:
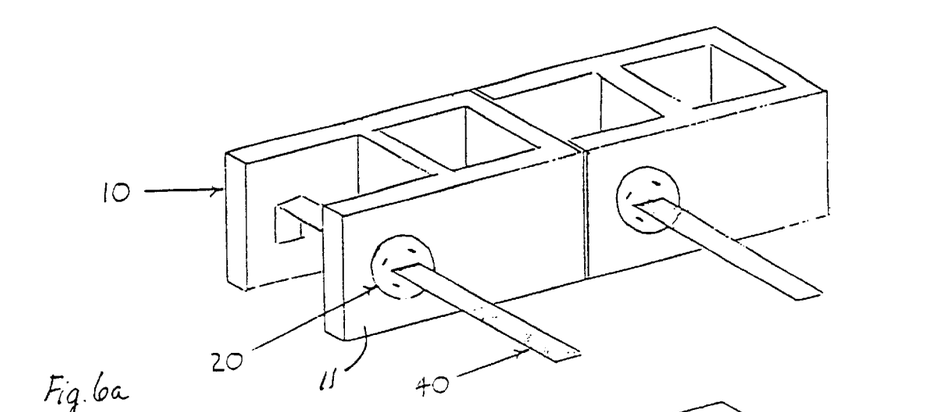
FIG. 6a shows the present invention used with a PA strap.
Figure 6B:
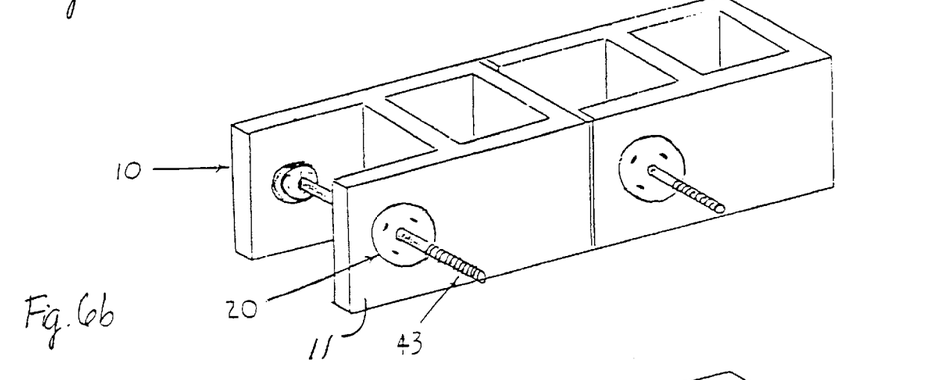
FIG. 6b shows the present invention used with a machine bolt.
Figure 6C:
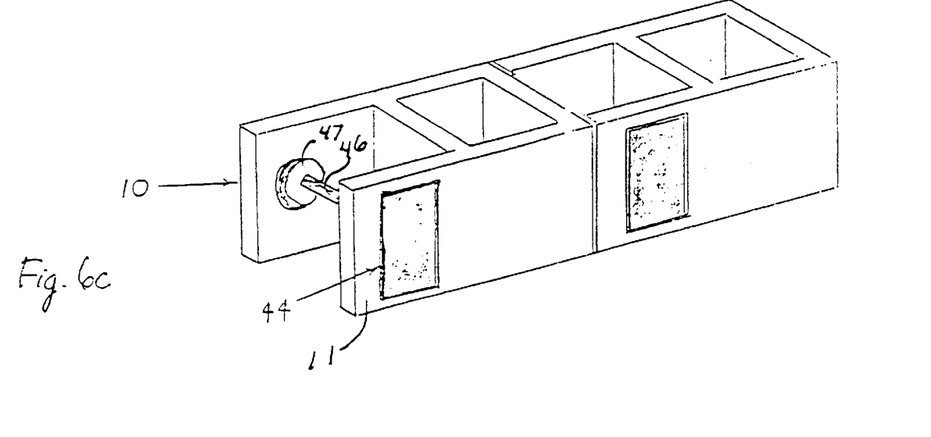
FIG. 6c shows the present invention used with a weld plate.

The versatility of the preferred embodiment of the invention is shown in attaching various embedded elements such as PA strap 40 in FIG. 6*a*, machine bolt 43 in FIG. 6*b*, and weld plate 44 in FIG. 6*c*. A weld plate provides a surface to which external objects may be welded. It has stem 46 and head 47. Cover plate 20 is fitted onto the stem by opening weakened joint 24 and sliding the cover plate onto the stem. Then the stem is inserted into the masonry hole.

A hole (not shown) is bored or otherwise formed in wall 11 of masonry block 10. The hole in block 10 is equal to or slightly larger than the diameter of land 25 of plate 20. A PA strap or a machine bolt, for example, can be placed in the hole and inserted through hole 23 in plate 20 as it projects outwardly from the inside the masonry block. Plate 20 is placed against wall 11 so that bosses 21 and land 25 project into the hole in the block and the inside surface of plate 20 is flush against the surface of wall 11. Straps 30 may be inserted through holes 19 in bosses 21 from inside the block until anchor elements 32 engage the inside surface of wall 11. Ridges 52 and teeth 55 are then fully engaged so that straps 30 are positively positioned. Another means of mounting is to partially insert the straps in holes 19, then bend the anchor element ends inwardly to allow them to pass through the masonry hole as the plate is applied to the masonry wall (see FIG. 9).

Figure 7:
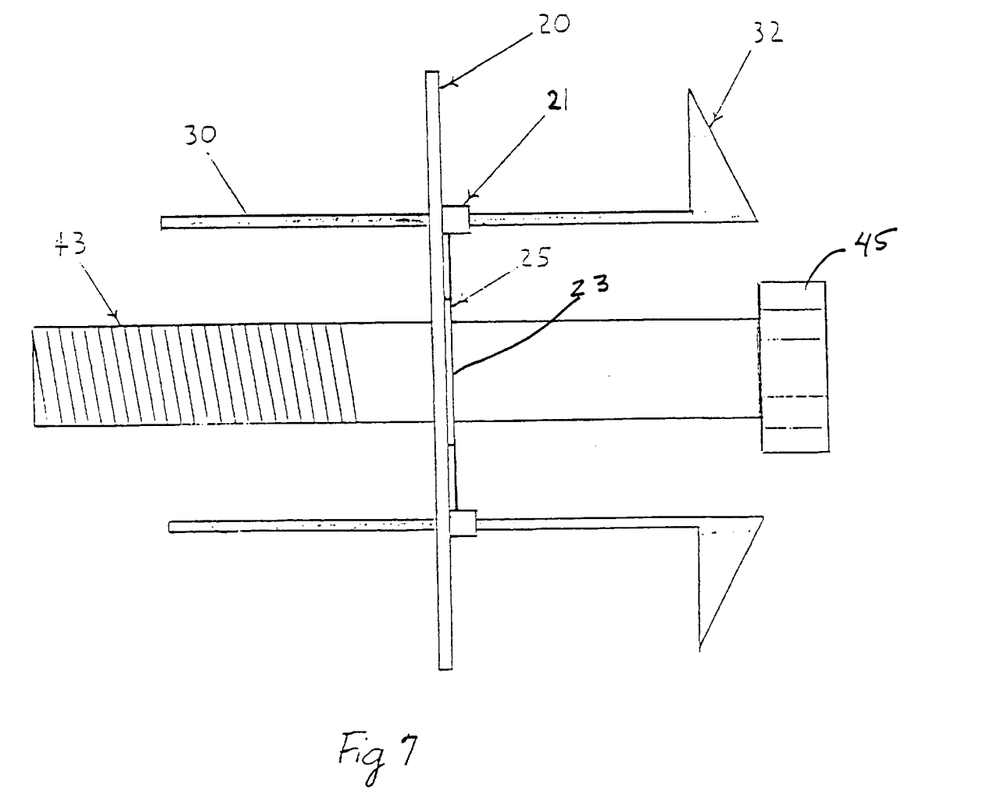
FIG. 7 is a side view of one embodiment of the present invention into which a machine bolt is inserted.

Referring now to FIG. 7, this side view shows the interrelationships of cover plate 20, securing strap 30, and threaded bolt 43, which has head 45. Bolt 43 fits into the rear or inside of cover plate 20 through securing member hole 23. Anchor portion 32 is then positioned so that it's narrowest dimension is directed away from the cover plate center. As contemplated herein, "anchor portion" refers to a structure that serves to prevent the device from falling out of the masonry hole. In a preferred embodiment, the anchor portion is triangular in shape with its narrowest dimension pointed away from the center of the securing member hole. This orientation ensures that the anchor portion will engage with the inner surface of the masonry element during installation of the device.

Figure 8:
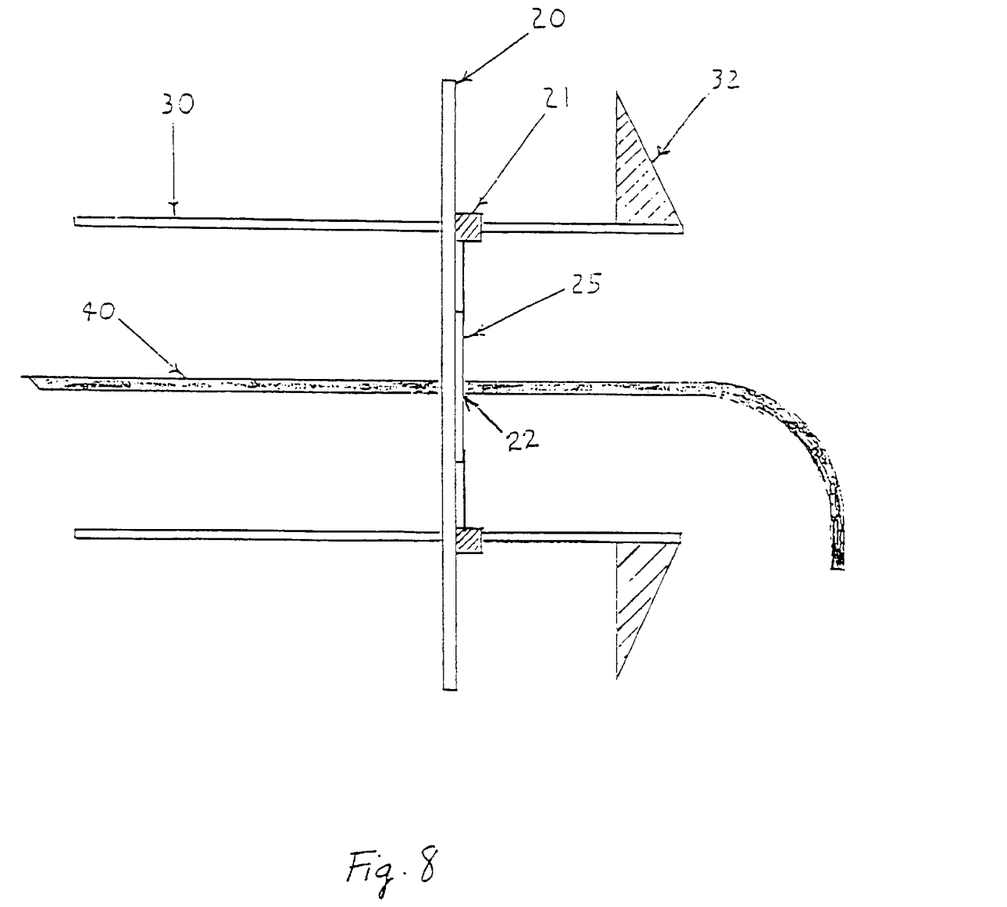
FIG. 8 is a side view of another embodiment of the present invention into which a PA strap is inserted.

A side view of plate 20, securing strap 30, and PA strap 40 demonstrates their interrelationships in FIG. 8. PA strap 40 fits into the rear of cover plate 20 through centered slot cut out 22. Straps 30 with anchor portions 32 function as previously described.

Figure 9:
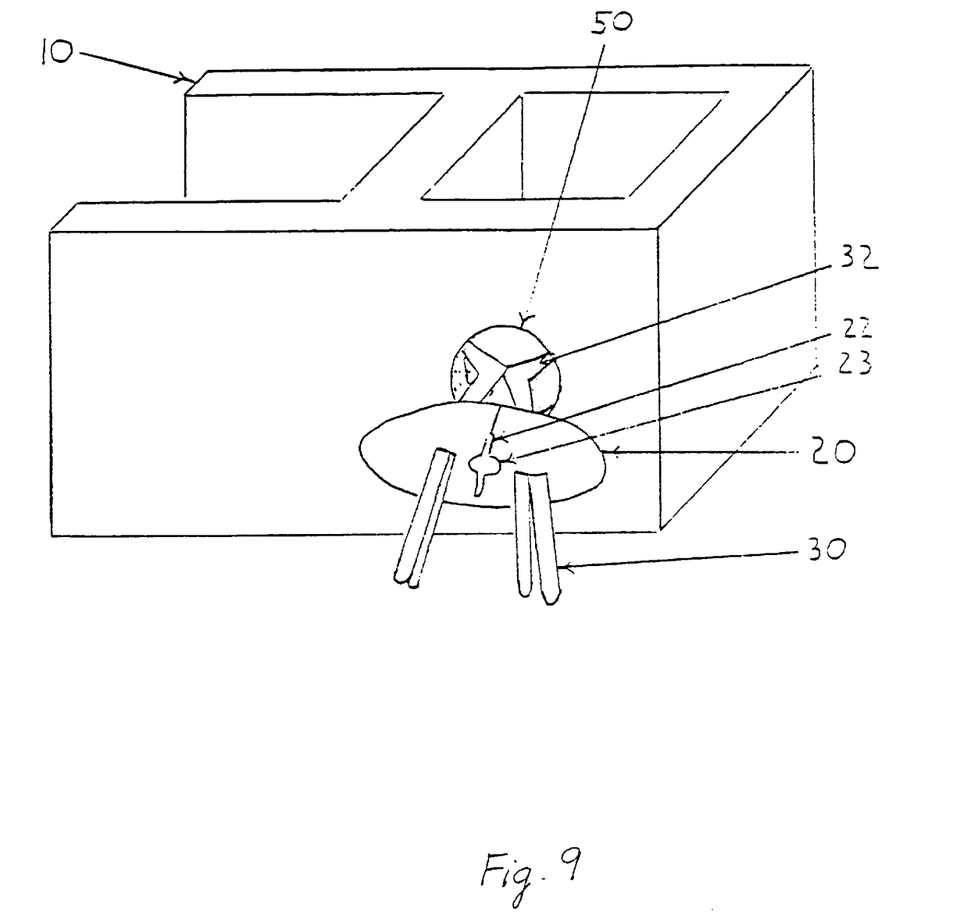
FIG. 9 shows the present invention partially installed into a piece of masonry.

FIG. 9 demonstrates a typical installation of the device of the present invention into a masonry element, such as concrete block. First, masonry hole 50 is drilled into the masonry wall. Securing straps 30 are inserted part way into the strap mounting holes in cover plate 20. A machine bolt or PA strap can be inserted through hole 23 or slot 22, respectively, before the cover plate is placed against the masonry surface. If a wall plate is employed it will be added after the cover plate is secured to the masonry element. The securing straps are contemplated to be resilient so they can be deformed toward the center to enable anchor portions 32 to fit through hole 50 and return to their original shape after being fully inserted through the masonry wall. The outwardly projecting ends of straps 30 are pulled outwardly so that anchor portions 32 then contact the inner surface of the masonry element, thereby preventing the device from falling out.

Although cover plate 20 is shown having a circular shape, its shape is not critical. It must only be larger than the masonry hole so it can be secured to the outside surface of the masonry wall by means of the securing straps and the anchor portions which engage the inside wall surface. Four mounting holes and securing straps are shown, but sufficient centering and engaging could be achieved with three, or even two securing straps. Under some circumstances only one securing strap might be used to simply hold the cover plate and the other element (PA strap, machine bolt, weld plate) in place while grout is poured and cured. On the other hand, there is no absolute limit to the number of securing straps that might be used. Under some circumstances it might be desired to employ five, or six, or even more securing straps through the cover plate.

A particular advantage of the present invention is that the cover plate is preferably made of a transparent material for easy visual inspection of grout flow. This further helps to detect and eliminate any incompletely grouted areas. If there are any voids or ungrouted areas, this can be detected through the transparent cover plate, giving the user the opportunity to take remedial action before the grout dries. This visual feedback is not appreciated or provided in the prior art devices, which are typically constructed of plywood and plate or sheet metal. In addition, if desired, various dyes or fluorescent materials can be added to the cover plate material during its manufacture to allow quick and easy location of the device on a masonry wall when, for example, construction work is being done in a dimly lit location, or after dark. Further, if desired, the cover plate can be made of a biodegradable plastic so that over time the cover plate disintegrates, leaving behind the embedded material. Various forms of biodegradable plastic material are well known to those skilled in the art.

While the present invention has been illustrated and described by means of specific embodiments and alternatives, it is to be understood that numerous changes and modifications can be made without departing from the spirit and scope of the invention. Therefore, it should be understood that the invention is not to be limited in any way except in accordance with the appended claims and their equivalents.

What is claimed is:

1. A device for securing a structure to a masonry wall, wherein the masonry wall has an outer surface and an inner surface spaced apart from the outer surface, and further having a masonry hole therethrough, said device comprising:

a plate larger than the masonry hole, said plate having a securing member hole therethrough; and at least one strap mounting hole therethrough radially spaced from the securing member hole, both the securing member hole and the strap mounting hole being configured to lie within the diameter of the masonry hole;

at least one elongated securing strap, said strap comprising a first portion at one end and an anchor portion disposed at an angle to said first portion at the opposite end, said securing strap being shaped and configured to extend through said strap mounting hole and the masonry hole so that the anchor portion of said securing strap contacts the inner surface of the masonry wall and said plate is positioned on the outer side of the masonry wall such that the securing member hole remains unobstructed and aligned with the masonry hole, thereby permitting the insertion of objects therethrough into the masonry hole.

2. The device of claim 1, wherein said securing strap has a plurality of transverse ridges formed on said first portion.

3. The device of claim 2, wherein said strap mounting hole has at least one tooth to engage said ridges on said securing strap.

4. The device of claim 1, and further comprising at least one boss projecting from said plate, said boss having a hole therethrough which is aligned with the mounting strap hole.

5. The device of claim 4, wherein said securing strap is formed with a plurality of transverse ridges on said first portion and said boss has at least one tooth to engage said ridges on said securing strap.

6. The device of claim 1, wherein said securing member hole is reinforced.

7. The device of claim 1, wherein said plate is transparent.

8. The device of claim 1, wherein said plate comprises material selected from the group consisting of polyethylene, rubber and nylon.

9. The device of claim 1, wherein said securing strap comprises material selected from the group consisting of polyethylene, rubber and nylon.

10. The device of claim 1, wherein said plate further comprises a weakened radial joint.

11. The device of claim 7, wherein said plate is fluorescent.

12. The device of claim 7, wherein said plate is biodegradable.

13. The device of claim 1, wherein said securing member hole is configured to accept a machine bolt.

14. The device of claim 1, wherein said securing member hole is configured to accept a purlin anchor strap.

15. The device of claim 1, wherein said securing member hole is configured to accept a weld plate.

16. The device of claim 4, wherein said plate is formed with a plurality of said bosses arranged to facilitate centering said securing member hole with the masonry hole when said plate is mounted on the masonry wall.

17. The device of claim 1, wherein the securing member hole is configured to accept a machine bolt, a PA strap and a weld plate.

18. The device of claim 1, wherein said plate is formed with at least two strap mounting holes therethrough.

19. The device of claim 1, wherein said cover is formed with at least three strap mounting holes therethrough.

20. The device of claim 1, wherein said plate is formed with at least four strap mounting holes therethrough.

21. A device for securing a structure to a masonry wall, wherein the masonry wall has an outer surface and an inner surface spaced apart from the outer surface, and further having a masonry hole therethrough, said device comprising:

means for covering the masonry hole, said covering means being formed with a securing member hole therethrough and at least one securing means hole therethrough, said securing means bole being spaced from said securing member hole;

at least one securing means, said securing means having an anchor portion at one end, said securing means being shaped and configured to be slidably engaged in said securing means hole and to extend through the masonry hole such that said anchor portion of said securing means contacts the inner surface of the masonry wall and said covering means is positioned on the outer surface of the masonry wall such that the securing member hole is generally concentric with the masonry hole.

22. The device of claim 21, wherein said means for covering the masonry hole comprises a transparent cover plate.

23. The device of claim 21, wherein the securing means comprises an elongated strap having lateral ridges thereon, said securing means hole having teeth therein, said ridges and teeth being configured to provide removable strap engagement of said strap in said securing means hole.

24. A method for securing structures to a masonry wall comprising the steps of:

forming a masonry hole in the masonry wall, the wall having an outer surface and an inner surface spaced apart from the outer surface;

placing at least one securing strap into the masonry hole, said securing strap comprising a first portion and an anchor portion disposed at an angle to the first portion such that the anchor portion contacts the inner surface of the masonry wall and the first portion extends through the masonry hole from the inner surface;

positioning a cover plate over the masonry hole, said plate being of sufficient size to cover the masonry hole, the plate having a securing member hole therethrough and at least one strap mounting hole therethrough;

sliding the securing strap through the strap mounting hole in the plate until the anchor portion of the securing strap contacts the inner surface and such that the plate contacts the outer surface of the masonry wall; and inserting and securing a securing member in the securing member hole.

25. The method of claim 24, wherein the masonry wall is part of a structure having a cavity, the inner surface of the masonry wall being one wall of the cavity, the method comprising the further steps of:

filling the cavity with grouting material; and connecting the structure to the securing member when the grout is sufficiently stabilized so that the structure is secured to the masonry wall.

26. The method of claim 24, wherein the cover plate is transparent.

27. The method of claim 24, wherein the cover plate further comprises a weakened radial joint.

28. The method of claim 27, further comprising the step of removing the cover plate by breaking the weakened joint after the grout is sufficiently stabilized.

* * * * *